United States Patent
Mangin et al.

(10) Patent No.: US 7,613,203 B2
(45) Date of Patent: Nov. 3, 2009

(54) METHOD AND DEVICE FOR MANAGING A SHARED TRANSMISSION MEDIUM BASED ON A TDMA/TDD SCHEME

(75) Inventors: Christophe Mangin, L'Hermitage (FR); Romain Rollet, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 785 days.

(21) Appl. No.: 10/962,607

(22) Filed: Oct. 13, 2004

(65) Prior Publication Data

US 2005/0111369 A1  May 26, 2005

(30) Foreign Application Priority Data

Nov. 6, 2003  (EP) .................................. 03292792

(51) Int. Cl.
  *H04L 12/413* (2006.01)
(52) U.S. Cl. ...................................... 370/445; 370/458
(58) Field of Classification Search .................. 370/389, 370/349, 321, 314, 312, 329, 337, 341, 347, 370/348, 464, 478, 445, 458, 431, 437, 442, 370/447, 459, 461
See application file for complete search history.

(56) References Cited

U.S. PATENT DOCUMENTS 6,445,701 B1 * 9/2002 Bahl .......................... 370/368

2002/0141355 A1  10/2002  Struhsaker et al.
2004/0131075 A1 *  7/2004  Sinnarajah et al. .......... 370/431

FOREIGN PATENT DOCUMENTS

| CN | 1293850 A | 5/2001 |
| WO | WO 00/31923 | 6/2000 |
| WO | WO 02/063806 A2 | 8/2002 |

* cited by examiner

*Primary Examiner*—Brenda Pham
(74) *Attorney, Agent, or Firm*—Oblon, Spivak, McClelland, Maier & Neustadt, L.L.P.

(57) ABSTRACT

There is disclosed a method and a device for managing a transmission medium shared between a set of wireless network devices which comprises a plurality of stations and a Radio Resource Management (RRM) unit. The method is based on a time division scheme carried out by said RRM unit. Time is divided in a series of Frame Time Intervals (FTIs), which are split into a given number n of Time Intervals (TIs), each TI having a respective duration (D). The ownership of each TI is dedicated to a group of TI owner devices (TOG), selected among the set of devices. Each TOG comprises a given number k of transmitting devices, which are allowed to transmit over the transmission medium during the TI considered, and a given number m of receiving devices, which listen to the transmission medium during this TI, where m and k are strictly positive integer.

31 Claims, 3 Drawing Sheets

METHOD AND DEVICE FOR MANAGING A SHARED TRANSMISSION MEDIUM BASED ON A TDMA/TDD SCHEME

BACKGROUND OF THE INVENTION

1. Technical Field

The present invention relates generally to communication systems and in particular, to a method for managing a shared transmission medium, based on a Time Division Multiple Access/Time Division Duplex (TDMA/TDD) scheme between a plurality of stations in a wireless local area network having an Access Point (AP).

2. Related Art

In the OSI ("Open System Interconnect") model of ISO ("International Standardization Organization"), the information is exchanged between layers on a per packet basis. Each packet received in a given layer is encoded with a set of encoding parameters specific to this layer. These parameters should be given through network administration means. The OSI model specifies a Data Link Layer which is in charge of sharing the physical resource between a plurality of stations. It is composed by two sub-layers namely the Logical Link (LL) sub-layer and the Medium Access Control (MAC) sub-layer. In a TDMA scheme, the MAC sub-layer may control the time period allocated to a given station for emission as well as the PHYsical layer (PHY) encoding parameters in order to provide a better service to the applications running on this station. The MAC sub-layer handles a set of MAC signalling messages to allow a plurality of stations to participate for sharing the physical resource, this set of messages being dependant on the MAC protocol specifically used.

The MAC protocols are able to manage either a distributed allocation scheme such as Carrier Sense Multiple Access with Collision Avoidance (CSMA/CA), which is a contention access scheme, or a centralised allocation scheme such as TDMA for instance.

A CSMA/CA capable station first listens to the medium and transmits packets only if the medium is free. If the medium is busy, the station retries access after a random back-off time period. To secure the packet transmission, the station waits for an acknowledgement from the receiver for each emitted packet. It results there from this that the CSMA/CA scheme introduces guard time and random back-off intervals during which the medium remains unused causing a waste of transmission resource even when there is no collision. In addition, the resulting contention exponentially increases with the number of stations in the network. Besides, CSMA/CA does not provide any guarantee on the transmission delay or on Quality of Service constraints, since no bandwidth reservation scheme is possible with this access scheme. Moreover, the stations must permanently listen to the medium because they may receive a message at any time. In fact, they decode all received messages in order to filter messages intended for another station. It results from this feature that some functions are difficult to implement, e.g. the power saving function, which can be desirable in the context of battery powered wireless stations.

On the contrary, in a MAC layer based on a centralised allocation of network transmission resource such as a Time Division Multiple Access/Time Division Duplex (TDMA/TDD) access scheme, the resource is divided in time periods that are respectively allocated to a particular station, the allocation being performed by a dedicated network entity. This type of access scheme allows to enforce some QoS constraints such as a minimum throughput or a maximum delay, and to enable advanced power saving functions. However, in such a centralised access scheme, it is difficult to achieve a fast reactivity between the time when a station requests transmission resource and the time when the transmission resource is actually allocated to the station. This is due to the complexity of the MAC protocol needed to achieve a centralised allocation scheme, which induces an important signalling overhead. This type of access scheme is better adapted to cellular network architectures, wherein the centralised allocation entity comprises also a gateway function to an external network. As a consequence, it is not really suitable for managing direct transmission between stations.

SUMMARY OF THE INVENTION

In view of the foregoing, there is a need for a TDMA/TDD MAC protocol guaranteeing transmission delay by providing a faster reactivity, while decreasing the signalling overhead, notably for direct transmissions between stations.

In a first aspect, the invention proposes a method for managing a transmission medium shared between a set of wireless network devices comprising a plurality of stations and a Radio Resource Management (RRM) unit, the method being based on a time division scheme carried out by the RRM unit and comprising the steps of:

providing a series of Frame Time Intervals (FTIs);

splitting each FTI into a given number n of Time Intervals (TIs), each having a respective duration (D), where n is a given integer; and, dedicating the ownership of at least one TI to a group of TI owner devices (TOG) selected among the set of devices, the TOG comprising a given number k of transmitting devices, which are allowed to transmit over the transmission medium during the TI and a given number m of receiving devices, which listen to the transmission medium during the TI, where m and k are strictly positive integer.

In a second aspect, the invention proposes a method for managing a transmission medium shared between a set of wireless network devices comprising a plurality of stations and a Radio Resource Management (RRM) unit based on a time division scheme carried out by the RRM unit, wherein the set of devices comprises at least one subset of devices including a Local RRM (L-RRM) unit, the method comprising the steps of:

providing a series of Frame Time Intervals (FTIs), splitting each FTI into a given number n of Time Intervals (TIs), each having a respective duration (D), where n is a given integer;

dedicating at least one TI to only the L-RRM unit, the TI called L-RRM TI;

splitting the L-RRM TI into q Local TIs (L-TIs), each having a respective duration, where q is a given integer; and, dedicating the ownership of at least one L-TI to a group of L-TI owner devices (L-TOG) selected among the subset of devices, the L-TOG comprising a given number r of transmitting devices, which are allowed to transmit over the transmission medium during the L-TI and a given number s of receiving devices, which listen to the transmission medium during the L-TI, where r and s are strictly positive integers;

It is important to note that in the description below, a given time period can be dedicated to a group of devices, that is when all the devices can receive or transmit during the time period, and more precisely a given time period can be allocated to a given device among the group of devices, that is when the given device can transmit during the time period.

BRIEF DESCRIPTION OF THE DRAWINGS

Further features and advantages of the present invention will become more apparent from the description below. The latter is given purely by way of illustration and should be read in conjunction with the appended drawings, of which.

DESCRIPTION OF PREFERRED EMBODIMENTS

The invention is applicable to any wireless local area network comprising a set of wireless network devices including a plurality of stations. This network further includes a Radio Resource Management (RRM) unit. The RRM unit can be embodied in one of the devices in the network or somehow distributed wherever in the network. For sake of better understanding, in the description below, the RRM unit is embodied in a given station. The plurality of stations, which are able and authorised to exchange signalling or data packets, will be referred to as the network.

In one exemplary embodiment, the invention is applied to the MAC sub-layer in the OSI Model Layers. Stated otherwise a MAC protocol according to the invention will now be described.

The MAC protocol described herein is based on a centralised allocation scheme of transmission resource, and more particularly on a TDMA/TDD access scheme, and relies on a time division into time periods of fixed size referred to as Frame Time Intervals (FTIs) in what follows. The following description will disclose a structure and a usage of these FTIs in a given network, managed by the RRM unit according to one exemplary embodiment of the invention.

Figure 1:
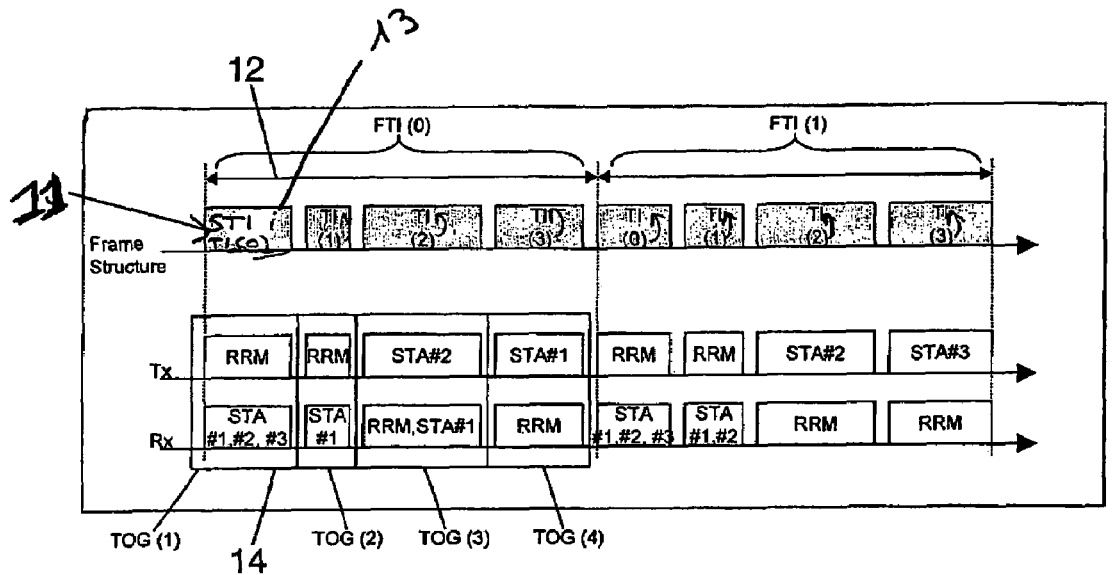
FIG. 1 illustrates the structure of two consecutive FTIs containing Tis dedicated to some stations according to an exemplary embodiment of the invention.

The RRM unit is in charge of dedicating the transmission resource to the stations. To achieve this aim, the RRM unit divides each FTI into a given n Time Intervals (TIs) of variable duration $D(i)$ and noted $TI(i)$, for $i=0$ to $n-1$. The numbers n and $D(i)$ are determined by the RRM unit on a per FTI basis. The TIs are arranged chronologically with $TI(0)$ being the first TI in a given FTI and $TI(n-1)$ the last one. The Frame Structure 11 in FIG. 1 illustrates this time division scheme, $FTI(0)$ 12 and $FTI(1)$ being each divided in 4 TIs.

The RRM unit dedicates the ownership of each TI of each FTI to a group of $TI(i)$ Owner device $(TOG(i))$ selected in the network. A given $TOG(i)$ comprises a given number k of transmitting stations, which are allowed to transmit during $TI(i)$, and a given number m of receiving stations which listen to the medium during $TI(i)$. In a preferred embodiment, the RRM unit determines dynamically on a per FTI basis the values of n and $D(i)$ as well as $TOG(i)$s with numbers m and k taking into account transmission needs of all stations of the network received through a set of MAC signalling messages. The latter will not be described here.

In a preferred embodiment, the previously defined values, n, and, for $i=0$ to $n-1$, $D(i)$, $TOG(i)$ with respective identifiers for the m receiving stations and the k transmitting stations, are advertised in a particular TI of each FTI. This particular TI is preferably $TI(0)$ with a variable length depending on the previously defined values. $TI(0)$ is to be listened by all the stations in the network, i.e. its respective $TOG(0)$ comprises all stations of the network. $TI(0)$ is allocated to the RRM unit at the beginning of each FTI and must be decoded by all stations. It results there from that each station of the network knows the structure of each FTI and this at a time corresponding to the beginning of the FTI. In particular, for each FTI, every station is able to determine when it will be allowed to emit and when it is supposed to receive messages, thanks to the TOGs information. Stated otherwise, the TOGs prevent all stations from having to listen the medium during the whole FTI when they are not emitting. Only stations that have messages intended for them within a given TI should listen to the medium, while others stations of the network can put themselves into sleep state during this TI. The power consumption can thus be reduced on a per TI basis. This particular TI is used by the RRM unit to transmit only signalling information, therefore $TI(0)$ is referred to as a Signalling TI (STI).

Another particular TI may be used as a Contention TI (CTI). Stated otherwise, a slotted ALOHA access scheme can be implemented using a set of one or more CTIs. In a preferred embodiment, all CTIs have the same duration, which should be defined through the administration of the network, and a single particular TOG, which defines all the stations of the network as transmitting stations and the RRM unit as preferably the sole receiving station. Stated otherwise, all stations are allowed to use all CTIs to communicate with the RRM unit. This CTI is advantageously used to allow initial message exchange, based on the set of MAC signalling messages, between a station and the RRM unit in order to make the RRM unit able to allocate transmission resource to this station in one or more of the next FTIs. It can also be used by the stations when no TI has been allocated to them. However, contention can occur when several stations attempt to access to the same CTI causing error in the receiver, which is the RRM unit. Consequently, an acknowledgement of each CTI is preferably returned by the RRM unit in the next FTI and retransmission is executed by the transmitting station after a random period has elapsed in case of transmission failure, this according to the slotted ALOHA access scheme. The CTI can only be used to emit signalling messages. All CTIs in a given FTI are grouped together into a CTI block in order to reduce signalling overhead.

In one embodiment of the present invention, it is possible to handle contention access for a given transmitting station with different priority levels. Actually, this priority level depends on the number of transmitting stations in the TOG comprising said transmitting station: the lesser the number of transmitting stations in a TOG, the higher the priority level of a contention access of a station in this TOG.

Stated otherwise, the number of transmitting stations in a given TOG defines a kind of priority level for each of these transmitting stations relatively to stations of another TOG.

Generally, except for both particular TIs described above, namely STI and CTI, any so-called normal TI is dedicated to a group of stations but it is allocated only to one station. Stated otherwise, in a preferred embodiment, only one station is allowed to transmit during a normal TI.

FIG. 1 illustrates the TIs for two consecutive FTIs with their respective TOGs. In the example shown, the network includes three stations referred to as: STA #1, STA #2 and STA #3. The first FTI will now be described in details; the description of the second FTI may be easily deduced from there. The first FTI (0) comprises 4 TIs (n=4). According to TOG(0), STI is dedicated to all the stations. The RRM unit is the only transmitting station. Stations STA #1, STA #2 and STA #3 are the receiving stations. According to TOG(1), TI(1) is dedicated to the RRM unit and the station STA #1, the RRM unit being the transmitting station and STA #1 being the receiving station. According to TOG(2), TI(2) is dedicated to station STA #2 as transmitting station and to the RRM unit and station STA #1 as receiving stations. According to TOG (3), TI(3) is dedicated to station STA #1 as transmitting station and the RRM unit as receiving station.

Figure 2:
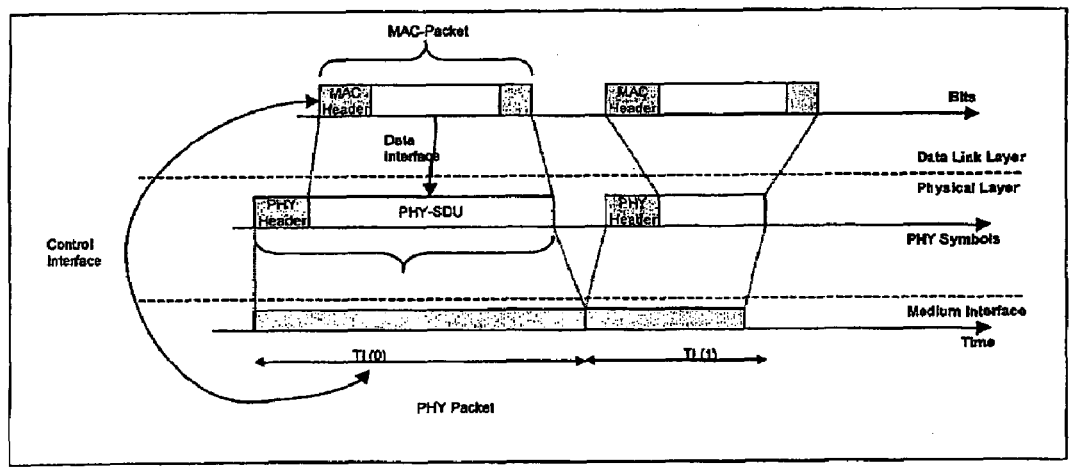
FIG. 2 is a view of an exemplary stack of protocol layers wherein the transmission resource is managed according to an exemplary embodiment of the invention.

As described above, characteristics of each TI(i), its location within the FTI it belongs to and its duration D(i) are dynamically determined by the RRM unit. It shall be noted that the duration D(i) of a given TI(i) corresponds to the time required to emit one PHY packet over the medium. Consequently, the D(i) calculation of a TI(i) depends firstly on the MAC packet size in bits, and secondly on the PHY encapsulation scheme, which further depends on PHY encoding parameters and yields an overhead inserted by the PHY. A conversion function provides the duration D(i), on the PHY, of the time interval TI as a function of a number of bits, corresponding to the MAC packet size encapsulated into the PHY packet. The RRM unit uses this conversion function through the PHY service access point. FIG. 2 illustrates the correspondence between the TI duration D(i) and the size of a MAC packet encapsulated by the PHY before being transmitted over the medium.

In a given normal TI, a MAC packet is emitted by the transmitting station of the corresponding TOG and is due to be received by all others stations of the corresponding TOG. On the receiving stations side, the PHY decodes data over the whole TI.

The MAC packet may comprise different parts that can be encoded and emitted with different parameters respectively at the MAC level and the PHY level. A default parameter set is determined and implicitly known by the stations so that no extra signalling is required by the receiver to decode the data.

A given TI is used by the stations according to the following rules:
 Signalling and/or data flow is intended for receiving stations included in the respective TOG;
 If the given TI is a CTI, it comprises signalling information only;
 If the given TI is STI, it is allocated to the RRM and comprises signalling information only, namely a description of the respective FTI.

For a normal TI, the respective transmitting station is allowed to emit either signalling packets and/or data packets, and more particularly, the transmitting station is allowed to dynamically adjust the proportion of signalling and data inside a given TI, on a per TI basis. Such a scheme improves the MAC layer reactivity while reducing the MAC signalling generally induced by a centralised access scheme. It shall be observed that several signalling and/or data packets are grouped in a single MAC packet, even if these packets are intended for different stations included in the corresponding TOG. It follows that all these stations receives this single MAC packet since the PHY multicasts it towards all of them.

The time division scheme being described herein above, the following sections will present in detail an exemplary MAC protocol based on a new MAC packet format, which allows to optimise the usage of the FTIs and TIs defined above.

Figure 3:
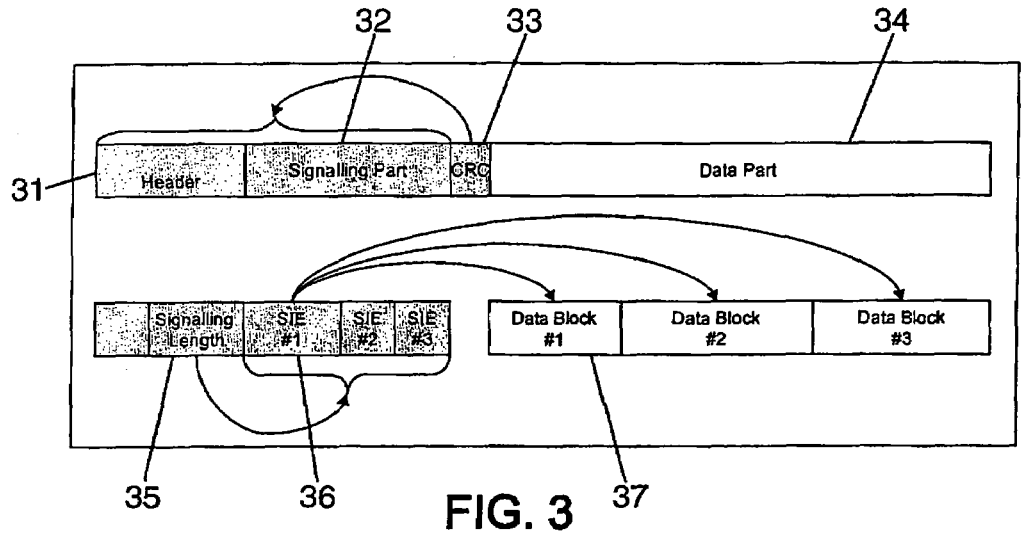
FIG. 3 illustrates an exemplary MAC packet format used in accordance with the MAC protocol of the invention.

FIG. 3 illustrates the general format of a MAC packet according to the example considered here. The MAC packet comprises a short Header part 31 and a variable length Signalling part 32. Both parts are protected by a CRC code 33 appended to the signalling part. The Header part contains a data field 35 which indicates the length of the Signalling part 32. In addition, the MAC packet may comprise a Data part 34 of variable length. Data part 34 contains one or more Data Blocks 37, each of which being intended for a particular receiving STA belonging to the TOG.

The signalling part 32 includes one or more Signalling Information Elements (SIE) 36. In a MAC packet transmitted in a STI, the first n−1 SIEs are TI Descriptor SIEs (TID-SIE). They contain, as explained above, the description of the subsequent n−1 TIs included in the FTI. Each TID-SIE includes the following information:
 Identifier of the transmitting station;
 Location of the TI within the FTI;
 D(i); and
 List of identifiers of the receiving stations.

The following SIEs may be a CTI Block Descriptor (CBD-SIE) in the respective FTI and a CTI Block Acknowledgement (CBA-SIE) corresponding to the acknowledgement relative to the CTI Block included in the previous FTI. In a preferred embodiment, the CBA is a Bit Map, which contains a status information about the MAC packets emitted in the CTIs of the previous FTI. For instance, when a MAC packet is correctly received in CTI of rank i in the CTI block, bit of rank i in the bit map of the CBA is set to one. If the MAC packet is not correctly received in the CTI or if no MAC packet has been transmitted during the CTI, bit of rank i is cleared. On reception of the CBA, the station checks the bit corresponding to the CTI it has used in the previous FTI in order to determine if the MAC packet sent in this particular CTI has been correctly received. If not, the station can attempt a new transmission of the MAC packet using a CTI at a later time according to the slotted ALOHA access scheme. The CBD-SIE comprises the number of CTIs in the CTI block and the location of the latter. As it has been explained above, a CTI is not used to emit any data part. Then, a MAC packet emitted during a CTI does not contain a Data part 34.

As far as a MAC packet containing a Data part 34 is concerned, the first SIE is a Data Part Descriptor SIE (DPD-SIE), including the description of all the Data Blocks of the data part. The DPD-SIE allows a given receiving station to determine if one or more of the Data Blocks in the Data Part are intended for itself and if so, to determine their location in the MAC packet. DPD-SIE comprises one field per described Data Blocks. Each field comprises the following information:
 List of identifiers of the receiving stations;
 Number of resource allocated for the Data Block (size);
 Set of PHY parameters used for encoding the Data Block; and,
 Set of MAC parameters used for encoding the Data Block.

MAC and PHY encoding can be adjusted on a per Data Block basis.

The Data Block characteristics are determined by the transmitting station and emitted in the DPD-SIE of the Signalling part preceding the respective Data Part.

Of course, some functions of the Data Link Layer can generate other SIEs identified by specific type identifiers, which can be intended for any stations included in the TOG.

Every receiving station of a given TOG decodes the Signalling part of the received MAC packet and checks the CRC. When the CRC check fails, the whole MAC packet is discarded. When the CRC check is successful, SIEs are interpreted according to their type identifier.

The content of the Data Blocks are not described in the present description.

Figure 4:
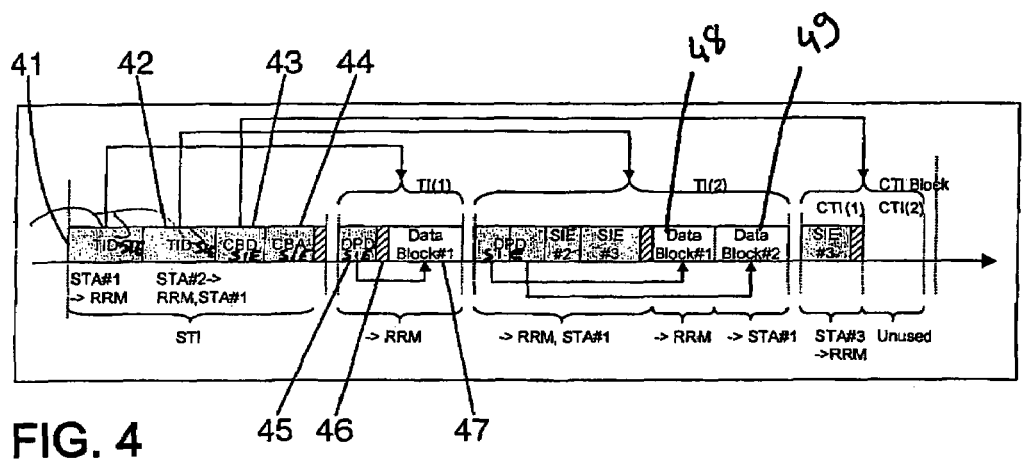
FIG. 4 illustrates usage of the shared medium according to the invention.

FIG. 4 illustrates an exemplary way of carrying out the invention, wherein an FTI is divided into 4 TIs: STI, TI(1), TI(2) and a CTI Block.

STI includes, as explained above, the description of the respective FTI. The first TID-SIE 41 describes TI(1) with its respective TOG(1) including the station STA #1 as the transmitting station and the RRM unit as the receiving station. The second TID-SIE 42 corresponds to the description of TI(2) and contains TOG(2) with station STA #2 as the transmitting station and the RRM unit and station STA#1 as the receiving stations. STI further comprises a CBD-SIE 43 including the description of the CTI Block and the CBA-SIE 44 corresponding to the acknowledgement of the CTI Block of the previous FTI.

In addition, FIG. 4 shows the MAC packet emitted by the station STA #1 towards the RRM unit. This MAC packet includes a DPD-SIE 45, followed by a CRC code 46, this DPD-SIE 45 describing the Data Block #1 47 with the respective receiving stations.

TI(2) is allocated to the transmitting station STA#2, which uses it to emit a Data Block #1 48 towards the RRM unit and a Data Block #2 49 towards station STA#1. The first SIE of the MAC packet is, as explained above, a DPD-SIE which describes Data Blocks #1 and #2. Station STA#2 uses TI(2) also to emit additional signalling messages SIE#2 and SIE #3. Herein, TI(2) is advantageously used by emitting signalling and data toward two different stations in the same MAC packet during the same TI.

The CTI Block, which could be used by all stations in the network, is herein only used by Station STA#3 to send SIE#3. Of course, as all packets emitted during a CTI, SIE#3 is emitted towards the RRM unit.

Now, a MAC protocol adapted to the time division scheme of an embodiment of the present invention has been described above. The next section discloses a protocol extension thereof, which is based upon applying again the teaching of the invention within a TI, in addition to a FTI. In fact, the FTI structure may recursively be repeated within a TI in order to further improve flexibility. For a sake of better understanding, the following section details this protocol extension.

This protocol extension assumes that the network includes at least one station with a Local Radio Resource Management (L-RRM) unit. In this case, the RRM unit allocates a normal TI to the L-RRM unit, the corresponding TOG comprising the L-RRM unit only. It results there from that the RRM unit decentralises the Radio Resource Allocation towards the L-RRM unit. This L-RRM unit splits this TI into several Local TIs referred to as L-TI(i). The L-RRM unit manages a so-called Local network of stations and can dedicate L-TI(i) to stations of this Local network dynamically according to their needs. It emits a Local TI(0), L-TI(0) at the beginning of its allocated TI. L-TI(0) includes the description of subsequent L-TIs, included in the same L-RRM TI, dedicated to Local TOGs (L-TOG) and it will be referred to as SL-TI. The format and content of SL-TI are similar to the format and content of STI, except that SL-TI may include a Data Part, as opposed to STI in the FTI. The stations included in an L-TOG use the L-TI in the same manner as the stations included in a TOG use the TI.

In this protocol extension, the TI allocated to the L-RRM unit, which is referred to as L-RRM TI, is particular in the sense that it can be used to transmit several MAC packets. More precisely, the TI contains at least SL-TI and one MAC packet per granted L-TI. All stations included in the Local network managed by the L-RRM unit decode STI to identify a TI dedicated to their L-RRM unit. The TOG corresponding to such a TI includes the L-RRM unit only. Then, these stations decode SL-TI emitted by the L-RRM unit in order to locate the respective L-TIs. Depending on the L-TOGs, the stations are allowed to emit MAC packets (signalling and/or data packets) or are listening to the medium in order to receive MAC packets sent by other stations of the Local network controlled by the L-RRM unit.

MAC packets emitted during a L-TI have the same format as MAC packets emitted during a TI and illustrated in FIG. 3. The signalling part 32 includes one or more SIE in the same manner as in the method described above. Therefore the L-TIs are described in L-TID-SIE included in the SL-TI of the L-RRM TI.

As a FTI may include one or more CTIs, which may be grouped in a CTI Block, a L-RRM TI may include one or more Local CTIs (L-CTIs), which may be grouped in a L-CTI Block, which is described by a L-CBD-SIE included in the SL-TI of the corresponding L-RRM TI. The SL-TI may also comprise a Local CBA SIE (L-CBA-SIE).

Figure 5:
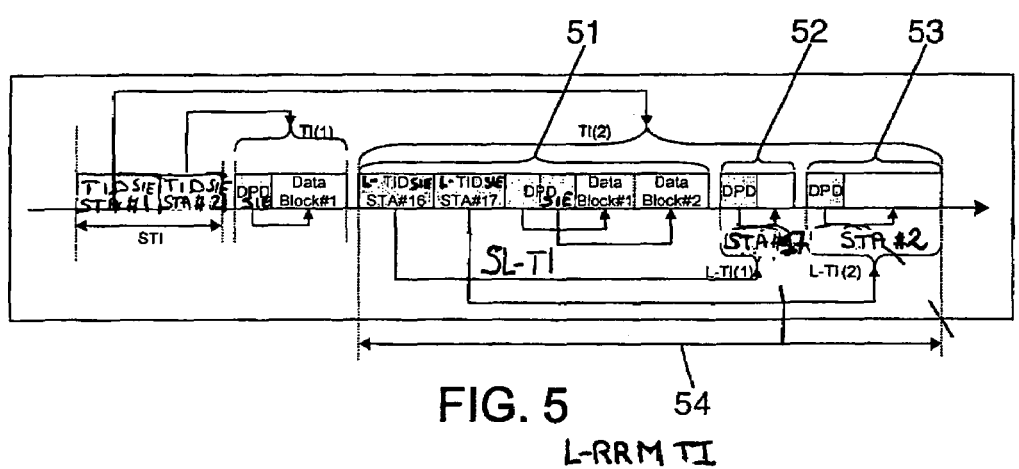
FIG. 5 is similar to FIG. 4 with some fields being further detailed.

FIG. 5 illustrates this protocol extension. STI of the given FTI describes two Tis of which the first one, TI(1), is dedicated to station STA #1 and the second one, TI(2) 54, is dedicated to station STA #2. Station STA #1 transmits a MAC packet comprising one Data Block during TI(1). Station STA #2 uses the TI(2) as a L-RRM TI 54. This L-RRM TI comprises SL-TI 51, L-TI(1) 52 and L-TI(2) 53. SL-TI 51 comprises two Local TID-SIEs (L-TID-SIE) corresponding to the description of L-TI(1) 52 and L-TI(2) 53, L-TI(1) being dedicated to the station STA #16 and L-TI(2) being dedicated to station STA #17. SL-TI 51 further comprises a Data part with its corresponding DPD-SIE. The station STA #16 uses the L-TI(1) 52 to transmit a MAC Data packet to the station STA #17. The station STA #17 uses the L-TI(2) 53 to transmit a MAC Data packet to the station STA #2 (i.e. the L-RRM).

Figure 6:
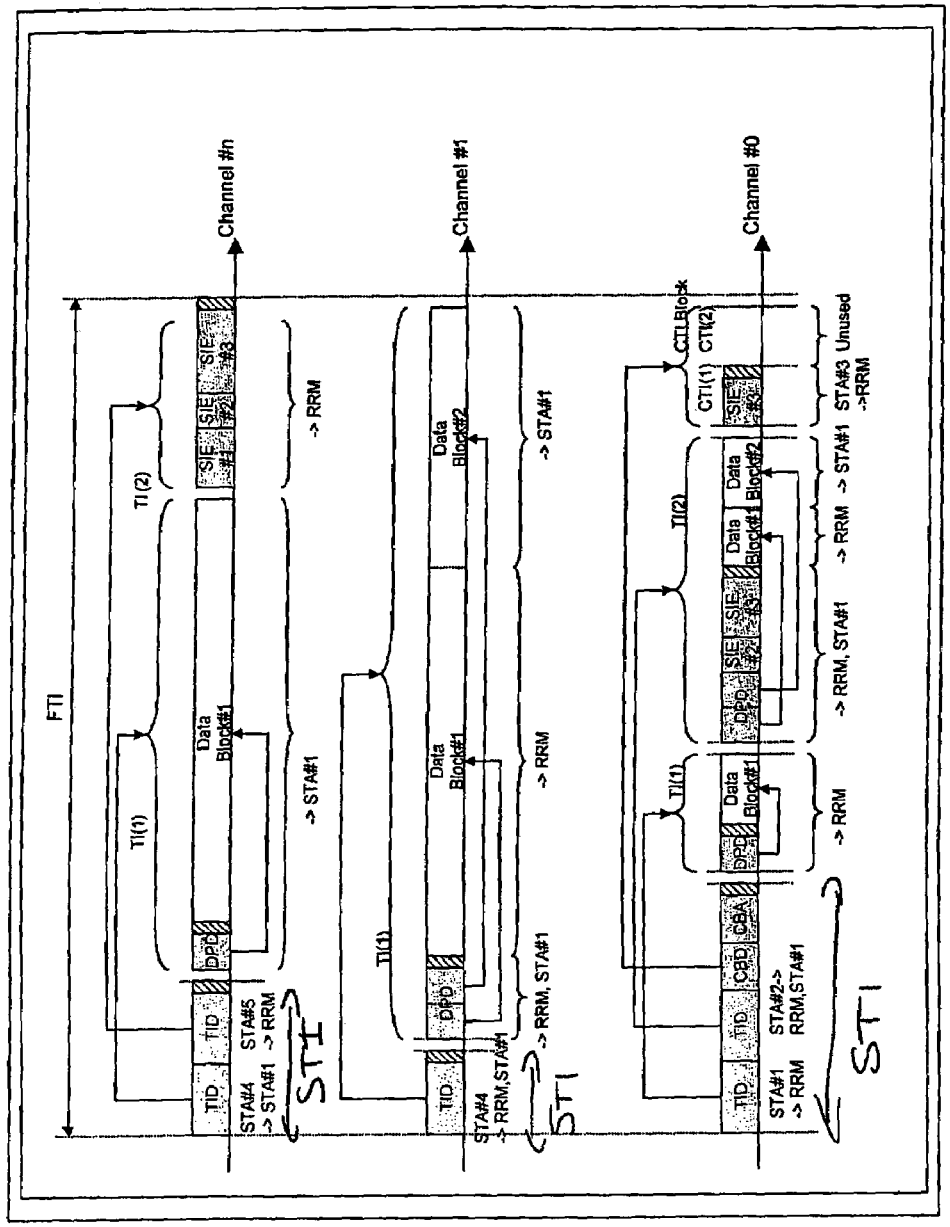
FIG. 6 illustrates an exemplary application of the invention wherein the MAC sub-layer manages several PHY channels.

This extension protocol provides more flexibility by decentralising a part of the allocation process to one or more L-RRM unit. This solution can be useful to integrate additional services in a modular network while keeping the original architecture. The L-RRM unit can be specialised in processing data flows generated by a particular application. The allocation should be decentralised for the following reasons:

a station is an application gateway and the resource allocation is performed more efficiently from this gateway than from the RRM unit;

some stations are not able to send packets to the RRM unit for physical reasons;

a group of stations implements a different PHY from the RRM unit's and requires a reserved TI for their communications because they make use of the same radio frequency band;

FIG. 6 illustrates how the protocol extension may be adapted to a PHY that provides transmission resource on several concurrent channels. In this case, the RRM unit manages resource provided by all channels and shares it between all stations. It is assumed that the FTIs of all channels are synchronised and that the RRM unit emits a STI on each channel at the beginning of each FTI. STI emitted on a given channel describes the allocated TIs for this channel only. The STI format and the usage of the TIs in each channel by the stations remain similar to the basic protocol.

A subset of channels is defined for each station. In a preferred embodiment, this subset of channels is defined from information exchanged during an initial procedure performed over a default channel between the stations and the RRM unit. FIG. 6 shows an example wherein:

the channels subset of station STA #1 includes the channel #0, the channel #1 and the channel #n;

the channels subset of station STA #2 includes the channel #0;

the channels subset of station STA #3 includes the channel #0;

the channels subset of station STA #4 includes the channel #1 and #n;

the channels subset of station STA #5 includes the channel #n.

The RRM unit performs the resource allocation for a given station on any channels of each subset. Consequently, the stations are forced to simultaneously decode STI on each channel of their respective subset. According to its respective capabilities, a given station can simultaneously be included in several TOGs associated to TIs allocated on different channels as shown in FIG. 6.

In the example according to FIG. 6, for the given FTI:

channel #0 is dedicated to stations STA #1, STA #2 and STA #3. STI defines 3 TIs and a CBA. The first TI has a TOG(1) with station STA #1 as the transmitting station and the RRM unit as the receiving station, the second one has a TOG(2) with station STA #2 as the transmitting station, the RRM unit and station STA #1 as receiving station. The third TI is a CTI Block. TI(1) is used by station STA #1 to send a Data Block to the RRM unit. TI(2) is used by station STA #2 to send a first Data Block #1 to the RRM unit and a second Data Block #2 to station STA#1. It is important to note here that Data Blocks #1 and #2 are, as it has been already described, sent in the same MAC packet that is multicasted at the PHY level. The CTI Block contains two CTIs, of which only one is used by station STA#3;

channel #1 is dedicated to station STA#1 and station STA#4. STI describes TI(1), which has a TOG(1) comprising station STA#4 as the transmitting station and the RRM unit and station STA#1 as receiving stations. TI(1) is used by station STA#4 to send one Data Block to the RRM unit and another Data Block to station STA#1, these Data Blocks being included in the same MAC packet;

channel #n is dedicated to stations STA#1, STA#4 and STA#5. STI describes TI(1), which has a TOG(1) comprising station STA#4 as the transmitting station and station STA#1 and the RRM unit as the receiving stations. Station STA#4 uses TI(1) to send a Data Block to station STA#1. TI(2) is described with TOG(2) comprising station STA#5 as the transmitting station. It is used by station STA#5 to send three SIEs to the RRM unit.

From the foregoing it will be appreciated that, although specific embodiments of the invention have been described herein for purposes of illustration, various modifications may be made without deviating from the scope of the invention. Accordingly, the invention is not limited except as by the appended claims.

The invention claimed is:

1. A method for managing a transmission medium shared between a set of wireless network devices comprising a plurality of stations and a Radio Resource Management (RRM) unit, said method being based on a time division scheme carried out by said RRM unit and comprising steps of:

said RRM unit providing a series of Frame Time Intervals (FTIs);

splitting each FTI into a give number n of Time Intervals (TIs), each having a respective duration (D), where n is a give integer; and dedicating the ownership of at least one TI to a group of TI owner devices (TOG) selected among said set of devices, said TOG comprising a given number k of transmitting devices, which are allowed to transmit over said transmission medium during said TI and a given number m of receiving devices, which listen to said transmission medium during said TI, where m and k may take any strictly positive integer values, wherein the number n of TIs in on FTI, and the respective duration and TOG of each of said n TIs are determined dynamically on a per FTI basis by the RRM unit, and the RRM unit determines the number n of TIs, and the respective duration and TOG of each one of said n TIs on the basis of information received from the respective stations.

2. The method of claim 1, wherein the RRM unit is embodied in at least one of the plurality of stations.

3. The method of claim 1, wherein all FTIs have the same duration.

4. The method of claim 1, wherein at least one of the TIs is a Contention TI (CTI), and wherein the TOG of said CTI comprises the plurality of stations as transmitting devices and the RRM unit as receiving device.

5. The method of claim 4, wherein all the CTIs have the same duration.

6. The method of claim 5, wherein at least one FTI comprises several CTIs which are grouped into a CTI Block.

7. The method of claim 1, wherein the first TI of at least one FTI is a Signalling TI (STI), and wherein the TOG of said STI comprises the RRM unit as transmitting device and the plurality of stations as receiving devices, and wherein said STI comprises description of n−1 subsequent TIs.

8. The method of claim 1, wherein a MAC packet of a MAC protocol is transmitted during any given TI in any FTI, each MAC packet being of variable length and including a Signalling part which comprises:

a MAC packet header, a Signalling length field containing information which describes the length of the Signalling part, a given number p of Signalling Information Elements (SIEs) of variable length, where p is an integer depending on each said MAC packet.

9. The method of claim 8, wherein the MAC packet transmitted in the STI contains TI Descriptor SIEs (TID-SIEs), each TID-SIE respectively describing one of the n−1 subsequent TIs, namely its duration, its location within the FTI, and its TOG via respective identifiers of the k transmitting devices and respective identifiers of the m receiving devices.

10. The method of claim 6 or 8, wherein the MAC packet transmitted in the STI of a FTI including a CTI Block comprises a CTI Block Descriptor SIE (CBD-SIE) for describing said CTI Block, which CBD-SIE comprises the location of said CTI Block within the ETI and the number of CTIs in said CTI Block.

11. The method of claim 10, wherein the MAC packet transmitted in the STI further comprises a CTI Block Acknowledgement Descriptor SIE (CBA-SIE), said CBA-SIE including an acknowledgement by the RRM unit associated to each CTI of the CTI Block in the previous FTI.

12. The method of claim 8, wherein the MAC packet further comprises a Data part with a corresponding specific Data Part Descriptor SIE (DPD-SIE), said Data part including one or more Data Blocks, each one of said Data Blocks being intended for at least one receiving device of the TOG of said TI, which device being determined via information comprised in said DPD-SIE.

13. The method of claim 12, wherein each of the Data Blocks are encoded with different encoding parameters at MAC level and/or at PHY level.

14. The method of claim 8, wherein the MAC packet includes a CRC code, which is computed on the Signalling part.

15. The method of claim 8, wherein the RRM unit determines the duration of a TI based on the size of the MAC packet which will be transmitted during said TI.

16. The method of claim 4 or claim 8, wherein only one MAC packet, which comprises exclusively the Signalling part, is transmitted during a CTI.

17. The method of claim 1, wherein at least one device handles several Physical Layer channels, and wherein the RRM unit dedicates TIs over said Physical Layer channels by applying the following steps: dedicating each of said Physical Layer channels to a sub group of stations selected according to the Physical Layer channels they are able to support, carrying out the method on each Physical Layer channel.

18. A method for managing a transmission medium shared between a set of wireless network devices comprising a plurality of stations and a Radio Resource Management (RRM) unit based on a time division scheme carried out by said RRM unit, wherein said set of devices comprises at least one subset of devices including a Local RRM (L-RRM) unit, said method comprising the steps of:
    said RRM unit providing a series of Frame Time Intervals (FTIs),
    splitting each FTI into a given number n of Time Intervals (TIs), each having a respective duration (D), where n is a given integer;
    dedicating at least one TI to only said L-RRM unit (L-RRM TI);
    splitting said L-RRM TI into q Local TIs (L-TIs), each having a respective duration, where q is a given integer; and
    dedicating the ownership of at least one L-TI to a group of L-TI owner devices (L-TOG) selected among said subset of devices, said L-TOG comprising a given number r of transmitting devices, which are allowed to transmit over said transmission medium during said L-TI and a given number of s of receiving devices, which listen to said transmission medium during said L-TI, where r and s are strictly positive integers,
    wherein the number q of L-TIs in a given L-RRM TI, and the respective duration and L-TOG of each one of said q L-TIs are determined dynamically by the L-RRM unit.

19. The method of claim 18 further comprising the step of:
    dedicating the ownership of at least an other one TI to a group of TI owner devices (TOG) selected among said set of devices, said TOG comprising a given number k of transmitting devices, which are allowed to transmit over said transmission medium during said TI and a given number m of receiving devices, which listen to said transmission medium during said TI, where m and k are strictly positive integers.

20. The method of claim 18, wherein the L-RRM unit determines the number q of L-TIs, and the respective duration and L-TOG of each one of said q L-TIs on the basis of information received from the respective stations.

21. The method of claim 18, wherein at least one of the L-TIs is a Local Contention TI (L-CTI), and wherein the L-TOG of said L-TI comprises the subset of devices as transmitting devices and the L-RRM unit as receiving device.

22. The method of claim 21, wherein all the L-CTIs have the same duration.

23. The method of claim 22, wherein at least one L-RRM TI comprises several L-CTIs which are grouped into a L-CTJ Block.

24. The method of claim 18, wherein the first L-TI in the L-RRM TI is a Signalling L-TI (SL-TI), and wherein the L-TOG comprises the L-RRM unit as transmitting device and the subset of devices as receiving devices, and wherein said SL-TI comprises description of q-1 subsequent L-TIs.

25. The method of claim 18, wherein a MAC packet of a MAC protocol is transmitted during any given L-TI in any L-RRM TI, each MAC packet being of variable length and including a Signalling part which comprises:
    a MAC packet header,
    a Signalling length field containing information which describes the length of the Signalling part,
    a given number p of Signalling Information Elements (SIEs) of variable length, where p is an integer depending on each said MAC packet.

26. The method of claim 25, wherein the MAC packet transmitted in the SL-TI contains L-TI Descriptor SIEs (L-TID-SIEs), each L-TID-SIE respectively describing one of the q-1 subsequent L-TIs, namely its duration, its location within the L-RRM TI, and its L-TOG via respective identifiers of the r transmitting devices and respective identifiers of the s receiving devices.

27. The method of claim 23 or 25, wherein the MAC packet transmitted in the SL-TI of a L-RRM TI including a L-CTI Block comprises a L-CTI Block Descriptor SIE (L-CBD-SIE) for describing said L-CTI Block, which L-CBD-SIE comprises the location of said L-CTI Block within the L-RRM TI and the number of L-CTIs in said L-CTI Block.

28. The method of claim 27, wherein the MAC packet transmitted in the SL-TI further comprises a L-CTI Block Acknowledgement Descriptor SIE (L-CBA-SIE), said L-CBA-SIE comprising an acknowledgement by the L-RRM unit associated to each L-CTI of the L-CTI Block in the previous L-RRM TI.

29. The method of claim 25, wherein the MAC packet further comprises a Data part with a corresponding specific Data Part Descriptor SIE (DPD-SIE), said Data part including one or more Data Blocks, each one of said Data Blocks being intended for at least one receiving device of the L-TOG of said L-TI, including SL-TI, which device being determined via information comprised in said DPD-SIE, wherein each of the Data Blocks are encoded with different encoding parameters at MAC level and/or at PHY level.

30. The method of claim 25, wherein the MAC packet includes a CRC code, which is computed on the Signalling part.

31. The method of claim 18, wherein at least one device handles several Physical Layer channels, and wherein the L-RRM unit dedicates L-TIs over said Physical Layer channels by applying the following steps:
    dedicating each of said Physical Layer channels to a sub group of stations selected according to the Physical Layer channels they are able to support,
    carrying out the method on each Physical Layer channel.

* * * * *